June 26, 1962  I. L. KANIN  3,040,470

CONTAINER FOR POISONED INSECT FOOD

Filed Nov. 18, 1959

INVENTOR.
Irving L. Kanin
BY
Morse & Altman
ATTORNEYS

United States Patent Office 3,040,470
Patented June 26, 1962

3,040,470
CONTAINER FOR POISONED INSECT FOOD
Irving L. Kanin, 25 Buckingham Road, Norwood, Mass.
Filed Nov. 18, 1959, Ser. No. 853,823
2 Claims. (Cl. 43—131)

The present invention relates to insect control and, more particularly, to insecticidal products of an unusually efficacious and inexpensive type providing a container of poisoned insect food, the container being so constructed as to hermetically contain the insect food until ready for use, to provide easy access for insects when in use and to provide secure connection to a base upon which the container is placed.

The object of the present invention is to provide such a construction in the form of a first sheet of organic polymer, which sheet provides a peripheral planar base and a medial dome having portions through which openings are to be made when in use, a second sheet bonded to the peripheral planar base and bearing a pressure sensitive adhesive, and a third sheet for temporarily masking said second sheet. The chamber, defined by the medial dome of the first sheet and the second sheet, preferably contains a poisoned insect food comprising a sugar containing component and a fat containing component.

Other objects of the present invention will in part be obvious and will in part appear hereinafter.

The invention accordingly comprises the product possessing the construction, combination of elements and arrangement of parts, which are exemplified in the following detailed disclosure and the scope of which will be indicated in the appended claims.

Figure 1:
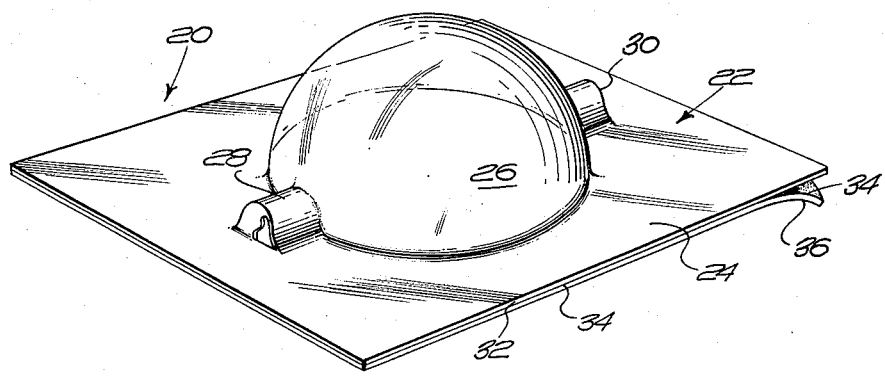
Figure 2:
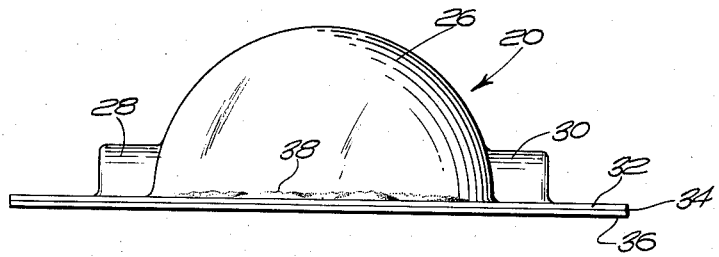

For a fuller understanding of the nature and object of the present invention reference should be had to the following detailed description taken in connection with the accompanying drawing wherein:

FIG. 1 is a perspective view of an insecticidal product embodying the present invention; and FIG. 2 is a side elevation of the product of FIG. 1.

The illustrated product, generally designated by 20, comprises an overlay 22, composed of an organic polymer such as cellulose acetate or polyvinyl alcohol, including a flat peripheral portion 24 and a medial dome portion 26, and a pair of opposed tunnel portions 28 and 30. All of these portions are provided in a simple blank by stamping or molding. These portions, for example, may be produced at the center of a flat thermoplastic sheet by heated mating dies pressed together. Bonded to flat portion 24 of overlay 22 is the upper face of a sheet 32 of paper or the like, at the lower face of which is a pressure sensitive adhesive 34. This pressure sensitive adhesive, for example, is composed of an elastomeric polymer such as rubber dispersed in a non-drying fluid such as glycerine. Normally covering pressure sensitive adhesive stratum 34 is masking stratum 36, composed for example of a silicone impregnated paper. Within the chamber defined by dome 26 and sheet 32 is a supply of poisoned food 38 in the form of particles containing a sugar material and a fat material, together with an insect poison, such as arsenic.

In operation, the illustrated construction may be affixed securely at any position upon a wall or floor by removing mask stratum 36 and pressing pressure sensitive adhesive 34 into position. During this time and while the construction is on the shelf, poisoned food 38 is protected from ambient conditions by sealed tunnels 28 and 30, dome 26 and underlay 32 which serve as a hermetic container. After the product is affixed in position, the ends of tunnels 28 and 30 are punctured in order to provide passages through which insects may enter and leave the chamber with access to food 38.

Since certain changes may be made in the above systems without departing from the scope of the invention herein involved, it is intended that all matter contained in the above description and shown in the accompanying drawing, shall be interpreted in an illustrative and not in a limiting sense.

What is claimed is:

1. A container for poisoned insect food comprising an overlay component including, as integral portions of a shaped sheet material composed of an organic polymer, an outwardly extending flat portion having an external periphery of predetermined configuration, said outwardly extending flat portion being disposed substantially in a first plane, a medial dome portion disposed externally of said first plane on one side thereof and having an external boundary connected to an internal boundary of said flat portion, an underlay component disposed substantially in a second plane, said underlay portion providing an upper surface the external periphery of which is bonded to said outwardly extending flat portion on the other side of said first plane, said dome and said underlay component together defining a chamber, said underlay component having an external periphery of said predetermined configuration, said external periphery of said flat portion being registered with said external periphery of said underlay component, the free face of said underlay component being provided with a pressure sensitive adhesive, and a mask component covering said pressure sensitive adhesive, said mask component having an external periphery of said predetermined configuration, said chamber being adapted to carry a food impregnated with an insecticidal composition.

2. The container of claim 1 wherein said overlay portion is provided with an inverted channel portion communicating with said dome portion.

References Cited in the file of this patent
UNITED STATES PATENTS

| 1,631,121 | Eckl | June 7, 1927 |
| 1,804,891 | Newman | May 12, 1931 |
| 1,820,186 | Gaskins | Aug. 25, 1931 |
| 2,808,679 | Collins | Oct. 8, 1957 |

FOREIGN PATENTS

| 1,008,282 | France | Feb. 13, 1952 |